US012674543B2

(12) United States Patent
Sari et al.

(10) Patent No.: US 12,674,543 B2
(45) Date of Patent: Jul. 7, 2026

(54) ARRANGEMENT FOR ATTACHMENT OF DEVICES TO A SURFACE AND METHOD FOR ATTACHING AN ARRANGEMENT TO A SURFACE

(71) Applicant: Axis AB, Lund (SE)

(72) Inventors: Alexander Sari, Lund (SE); Nina Ohlin, Lund (SE)

(73) Assignee: Axis AB, Lund (SE)

( * ) Notice: Subject to any disclaimer, the term of this patent is extended or adjusted under 35 U.S.C. 154(b) by 120 days.

(21) Appl. No.: 18/645,937

(22) Filed: Apr. 25, 2024

(65) Prior Publication Data

US 2024/0368881 A1 Nov. 7, 2024

(30) Foreign Application Priority Data

May 2, 2023 (EP) ..................................... 23171100

(51) Int. Cl.
*F16M 13/02* (2006.01)
*A47B 95/00* (2006.01)
(Continued)

(52) U.S. Cl.
CPC ........... *F16M 13/02* (2013.01); *A47B 95/008* (2013.01); *A47B 96/06* (2013.01); *A47G 1/1606* (2013.01);
(Continued)

(58) Field of Classification Search
CPC . H02G 3/10; F16M 13/02; H02B 1/40; A47B 95/008; A47B 96/06;
(Continued)

(56) References Cited

U.S. PATENT DOCUMENTS 2,521,134 A * 9/1950 Stanitz ................. A47B 95/008
312/107
4,571,910 A * 2/1986 Cosentino ........... E04F 13/0835
52/391
(Continued)

FOREIGN PATENT DOCUMENTS

| CA | 2585947 A1 | 10/2008 |
| CN | 111818248 A | 10/2020 |
| DE | 202019106941 U1 | 2/2020 |

OTHER PUBLICATIONS

Extended European Search Report issued on Oct. 25, 2023 for European Patent Application No. 23171100.3.

*Primary Examiner* — Andrew J Triggs
(74) *Attorney, Agent, or Firm* — Volpe Koenig

(57) ABSTRACT

An arrangement for attachment of devices to a surface, such as a wall, comprises at least one device, and for each device, at least two mounting brackets. Each device has a rear side provided with a recess for each mounting bracket, wherein each mounting bracket has a male connector end and a female connector end, the male connector end being configured to be received by the female connector end of an adjoining mounting bracket associated to a neighbouring device. Each male connector end is provided with a through hole for receiving an attachment means, such as a screw. Each mounting bracket is insertable into its associated recess with an orientation in which the male connector end extends beyond a periphery of the device, and each mounting bracket is insertable into its associated recess with an orientation in which the female connector end is accessible from the periphery of the device.

13 Claims, 8 Drawing Sheets

(51) Int. Cl.
    *A47B 96/06*        (2006.01)
    *A47G 1/16*         (2006.01)
    *E04F 13/08*       (2006.01)
    *E04F 13/24*       (2006.01)
    *H02B 1/40*        (2006.01)

(52) U.S. Cl.
    CPC ...... *E04F 13/0801* (2013.01); *E04F 13/0821*
          (2013.01); *E04F 13/0835* (2013.01); *E04F*
         *13/24* (2013.01); *H02B 1/40* (2013.01); *G09G*
                           *2300/026* (2013.01)

(58) Field of Classification Search
    CPC . G04F 15/0018; A47G 1/1606; G09F 3/1446;
            G09G 2300/026; E04F 13/0821; E04F
            13/0835; E04F 13/0857; E04F 13/0862;
            E04F 13/21; E04F 13/24; E04F 13/0801;
                      E04B 2/271; E04B 2/721
    See application file for complete search history.

(56)                  References Cited

U.S. PATENT DOCUMENTS

| | | | |
|---|---|---|---|
| 7,572,975 B2 * | 8/2009 | Ruihley | H02G 3/081 |
| | | | 174/64 |
| 8,167,257 B2 * | 5/2012 | Beauvais | H02B 1/40 |
| | | | 248/217.1 |
| 9,477,438 B1 * | 10/2016 | Hochman | H01R 12/727 |
| 9,864,561 B2 * | 1/2018 | Hochman | H01R 25/00 |
| 2008/0265117 A1 * | 10/2008 | Beauvais | H02B 1/40 |
| | | | 248/309.1 |
| 2017/0202375 A1 | 7/2017 | Fattahi et al. | |
| 2017/0220310 A1 | 8/2017 | Hochman | |
| 2018/0206631 A1 | 7/2018 | Bryans et al. | |
| 2021/0372559 A1 | 12/2021 | Yang et al. | |
| 2022/0015540 A1 | 1/2022 | Roach | |

\* cited by examiner

ARRANGEMENT FOR ATTACHMENT OF DEVICES TO A SURFACE AND METHOD FOR ATTACHING AN ARRANGEMENT TO A SURFACE

FIELD OF INVENTION

The present invention relates to an arrangement for attachment of devices to a surface and a method for attaching such an arrangement to a surface.

TECHNICAL BACKGROUND

In many situations, it may be desirable to attach devices to a surface, such as a wall. The devices may be arranged in one or more arrays, i.e. next to each other.

The devices may for instance comprise electronic units, such as I/O relay modules for access control systems.

Often, mounting brackets are used for supporting the devices, which mounting brackets are attached to the surface, for instance by means of screws.

In CA2585947A1 such an arrangement for attachment of devices to a surface is disclosed.

The mounting of several devices by means of such mounting brackets may be time consuming and there thus exists a need for an improved arrangement for attachment of devices to a surface.

SUMMARY

In view of that stated above, it is an object of the present invention to provide an improved arrangement for attachment of devices to a surface, such as a wall.

It is also an object to provide such an arrangement which may facilitate and speed up the attachment of the devices.

A further object is to provide a method for attaching such an arrangement to a surface.

To achieve at least one of the above objects and also other objects that will be evident from the following description, an arrangement having the features defined in claim 1 and a method having the features defined in claim 12 are provided according to the present invention. Preferred embodiments will be evident from the dependent claims.

More specifically, there is provided according to a first aspect of the present invention an arrangement for attachment of devices to a surface, such as a wall, the arrangement comprising at least one device, and for each device, at least two mounting brackets, wherein each device has a rear side provided with a recess for each mounting bracket associated to the device, wherein each mounting bracket has a male connector end and a female connector end, the male connector end being configured to be received by the female connector end of an adjoining mounting bracket associated to a neighbouring device, wherein each male connector end is provided with at least one through hole for receiving an attachment means, such as a screw, wherein each mounting bracket is insertable into its associated recess with an orientation in which the male connector end extends beyond a periphery of the device, and wherein each mounting bracket is insertable into its associated recess with an orientation in which the female connector end is accessible from the periphery of the device.

Hereby, an improved arrangement for attachment of devices to a surface, such as a wall, is provided.

More specifically, the arrangement enables utilization of an already attached or mounted device when attaching or mounting a subsequent device, thereby facilitating and speeding up the process of attaching the arrangement to a surface.

Each device has a rear side provided with recesses into which a respective mounting bracket is insertable with two possible orientations, one in which a male connector end of the mounting bracket extends beyond the periphery of the device and one in which the female connector end of the mounting bracket is accessible from the periphery of the device.

Thus, when mounting a first device of the arrangement, each mounting bracket may be inserted into its respective recess of the first device with the orientation in which the male connector end extends beyond the periphery of the first device, thereby enabling attachment of the first device to the surface by means of an attachment means, such as a screw, by utilization of the through hole provided in said male connector end of each mounting bracket.

For mounting a second device of the arrangement as a neighbouring device to the first device, one mounting bracket may be inserted into its respective recess of the second device with the orientation in which the female connector end is accessible from the periphery of the second device, and one mounting bracket may be inserted into its respective recess of the second device with the orientation in which the male connector end extends beyond the periphery of the second device. Subsequently, the second device may be arranged next to the first device such that the male end connector of the adjoining mounting bracket of the first device is received by the female connector end of the mounting bracket having the orientation in which the female connector end is accessible from the periphery of the second device. Finally, the second device may be secured to the surface by means of an attachment means, such as a screw, by utilization of the through hole provided in said male connector end of the mounting bracket having the orientation in which the male connector end extends beyond the periphery of the second device.

The arrangement makes it possible to mount devices flush against the surface, without adding a distance between the device and the surface, as is the case when mounting devices using known DIN rails.

According to an embodiment, the male connector end of each mounting bracket may be provided with a male connector engagement surface and the female connector end of each mounting bracket may be provided with a female connector engagement surface, wherein the male connector engagement surface of the male connector end of each mounting bracket is configured to engage the female connector engagement surface of the female connector end of an adjoining mounting bracket associated to a neighbouring device such that movement of the neighbouring device is restricted when the male connector end is received by the female connector end of the adjoining mounting bracket. The female connector engagement surface and the male connector engagement surface may be chamfered. The male connector engagement surface of the male connector end of each mounting bracket may be configured to engage the female connector engagement surface of the female connector end of an adjoining mounting bracket associated to a neighbouring device such that the neighbouring device is pressed against the surface.

According to another embodiment, each mounting bracket may be insertable into its associated recess with a snap fit. Hereby, the mounting brackets may be easily and reliably connected to the at least one device.

According to yet another embodiment, each mounting bracket may be provided with at least one abutment surface configured to engage its associated device in response to attaching the device to the surface by means of the attachment means, such as a screw, extending through the at least one through hole of the male connector end of the mounting bracket or in response to the male end connector of an adjoining mounting bracket of a neighbouring device being received by the female connector end of the mounting bracket such that the device is pressed against the surface.

According to yet another embodiment, each recess of each device may have an opening facing the periphery of the device such that the mounting bracket associated to the recess is slidingly insertable into the recess from a lateral side of the device.

According to yet another embodiment, the recesses of each device may form at least one pair of oppositely arranged recesses. The arrangement of oppositely arranged recesses enables mounting several devices next to each other for forming of a row or column.

According to yet another embodiment, each device may be rectangular in shape and have a first major surface; an opposing second major surface forming said rear side of the device; and four side edges forming said periphery of the device and extending between the first and second major surface. The recesses provided in the rear surface of each device may comprise a first recess arranged in a rear surface portion adjoining a first side edge of said four side edges of the device; and a second recess arranged in a rear surface portion adjoining a second side edge of said four side edges of the device, said second side edge being opposite to the first side edge. The recesses provided in the rear surface of each device may further comprise a third recess arranged in a rear surface portion adjoining a third side edge of said four side edges of the device; and a fourth recess arranged in a rear surface portion adjoining a fourth side edge of said four side edges of the device, said third side edge being opposite to the fourth side edge. The provisions of recesses in the rear surface portions adjoining the first, second, third and fourth side edge enables attachment of the of devices on the surface for forming a row and/or column.

According to yet another embodiment, the at least one device may comprise a device in the form of an electronic unit, such as a 1/O relay module for an access control system.

According to a second aspect of the present invention, there is provided a method for attaching an arrangement to a surface, such as a wall, the method comprising: providing an arrangement according to the first aspect of the present invention, inserting mounting brackets into the associated recesses of a first device of said at least one device with the orientation in which the male connector end of each mounting bracket extends beyond the periphery of the first device, and attaching the first device to the surface by means of an attachment means, such as a screw, extending through the at least one through hole of the male connector end of each mounting bracket.

Hereby, an improved method for attaching an arrangement to a surface, such as a wall, is provided.

More specifically, the method enables efficient attachment of the arrangement to the surface by arranging the mounting brackets of the first device with the orientation in which the male connector end of each mounting bracket extends beyond the periphery of the first device. Hereby, the first device may be secured to the surface by means of the attachment means extending through the trough holes of the male connector end of each mounting bracket, while the male connector ends also may be utilized when attaching a subsequent a second device to the surface, next to the first device.

According to an embodiment, the method may further comprise inserting mounting brackets into the associated recesses of a second device of said at least one device, wherein a first of the mounting brackets is inserted in its associated recess with the orientation in which the female connector end is accessible from the periphery of the second device and wherein a second of the mounting brackets is inserted in its associated recess with the orientation in which the male connector end extends beyond the periphery of the second device, arranging the second device next to the first device such that the male connector end of one of the mounting brackets of the first device is received by the female connector end of the first of the mounting brackets of the second device, and attaching the second device to the surface by means of an attachment means, such as a screw, extending through the at least one through hole of the male connector end of the second of the mounting brackets of the second device.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIG. 2b is a top view of the mounting bracket shown in FIG. 2a.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 4A:
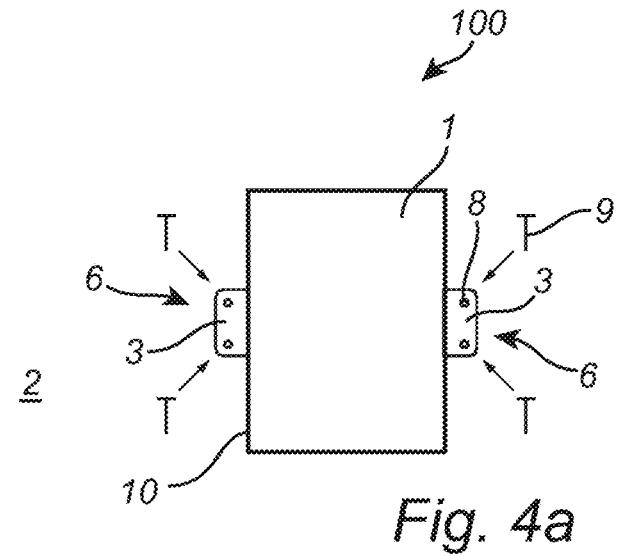
FIGS. 4a-c are schematic views illustrating steps of an embodiment in accordance with the present invention for attaching an arrangement to a surface.

The present invention relates to an arrangement 100, as illustrated for instance in FIG. 4*a*, for attachment of devices 1 to a surface 2, such as a wall.

The arrangement 100 comprises at least one device 1 and for each device, at least two mounting brackets 3.

The device 1 may be an electronic unit, such as an I/O relay module for an access control system.

Figure 1:
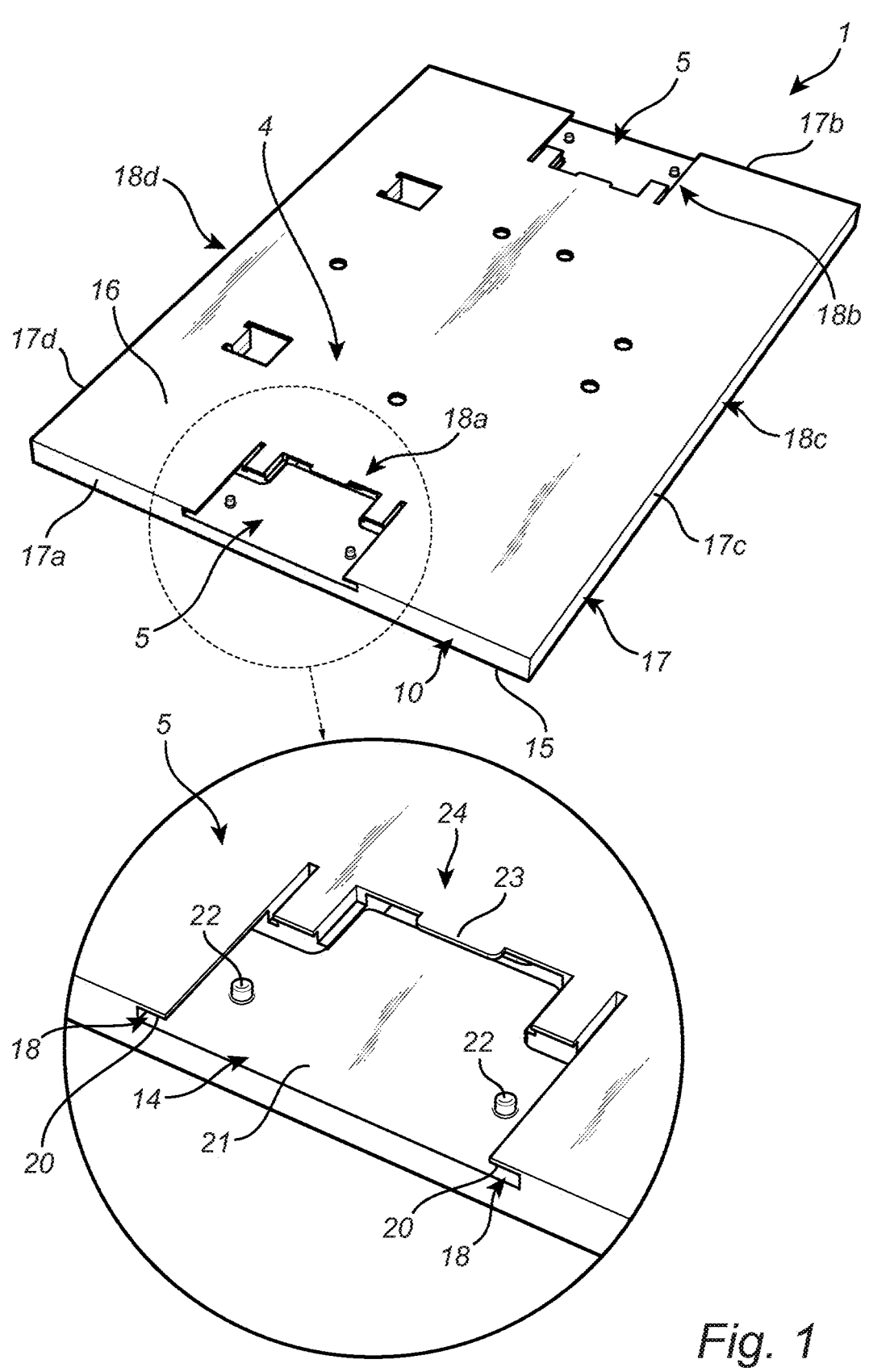
FIG. 1 is a perspective view of a device for an arrangement in accordance with the present invention.
Figure 2A:
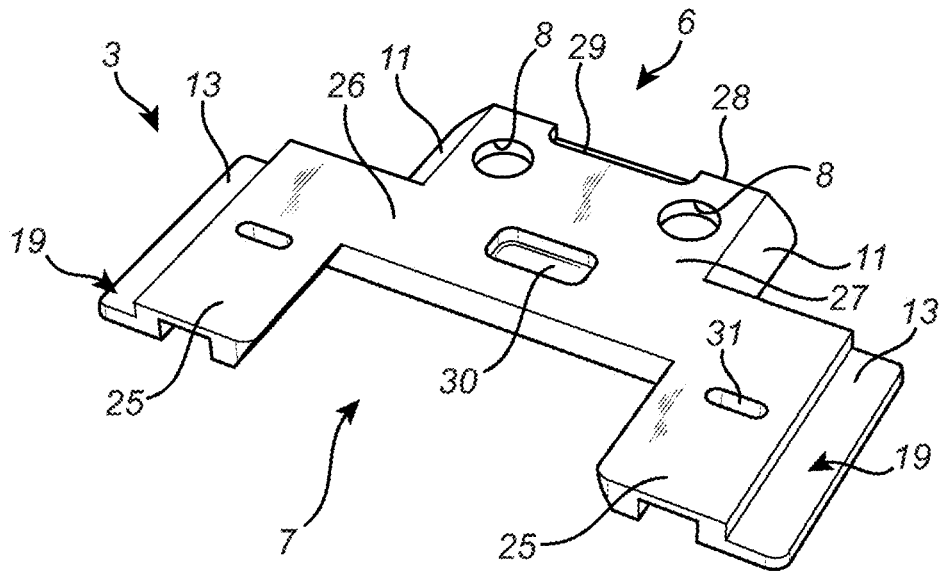
FIG. 2a is a bottom view of a mounting bracket for an arrangement in accordance with the present invention.
Figure 2B:
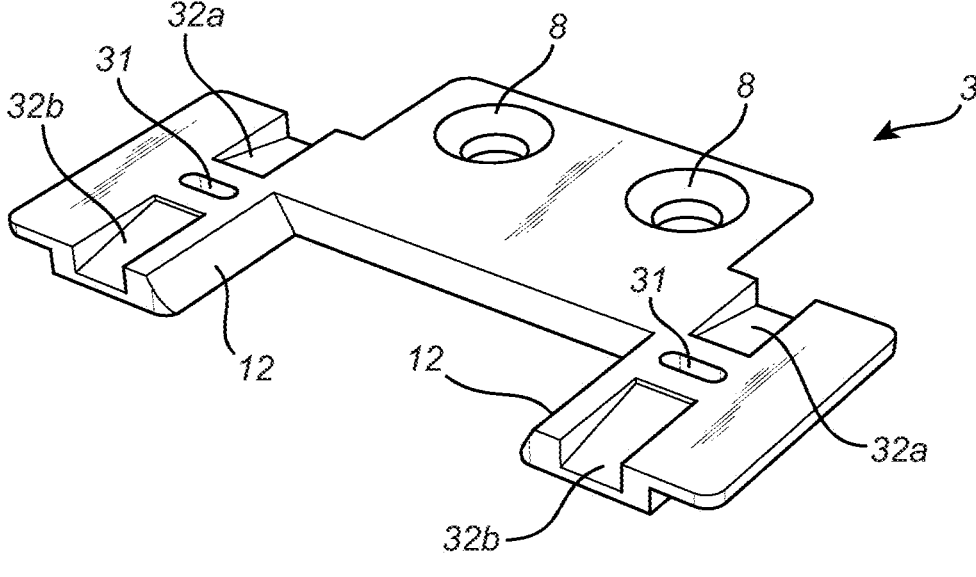

An embodiment of a device 1 comprised in an arrangement in accordance with the present invention is shown in FIG. 1 and an embodiment of a mounting bracket 3 comprised in an arrangement in accordance with the present invention is shown in FIGS. 2*a* and 2*b*, wherein FIG. 2*a* illustrates a bottom view and FIG. 2*b* illustrates a top view.

The device 1 has a rear side 4 provided with a recess 5 for each mounting bracket 3 associated to the device 1. In the shown embodiment, the rear side 4 is provided with two recesses 5. Each mounting bracket 3 is insertable into its associated recess 5. One of the recesses 5 is shown more in detail in the detached enlargement in FIG. 1.

Each recess 5 may have an opening 14 facing a periphery 10 of the device 1.

The device 1 may be rectangular in shape and may have a first major surface 15; an opposing second major surface 16 forming said rear side 4 of the device 1; and four side edges 17 forming said periphery 10 of the device 1 and extending between the first 15 and second major surface 16.

The recesses 5 may form at least one pair of oppositely arranged recesses 5. In the shown embodiment, the recesses 5 form a single pair of oppositely arranged recesses 5. More specifically, the recesses 5 provided in the rear surface 4 of the shown device 1 comprise a first recess 5 arranged in a rear surface portion 18*a* adjoining a first side edge 17*a* of the four side edges 17 of the device 1; and a second recess 5 arranged in a rear surface portion 18*b* adjoining a second side edge 17*b* of said four side edges 17 of the device 1, said second side edge 17*b* being opposite to the first side edge 17*a*. It is understood that the device 1 also may comprise a third recess (not shown) arranged in a rear surface portion 18*c* adjoining a third side edge 17*c* of said four side edges 17 of the device 1; and a fourth recess (not shown) arranged in a rear surface portion 18*d* adjoining a fourth side edge 17*d* of said four side edges 17 of the device 1, said third side edge 17*c* being opposite to the fourth side edge 17*d*.

Each recess 5 may comprise one or more grooves 18, each groove 18 being configured to receive a flange 19 of the mounting bracket 3 associated to the recess 5 when the mounting bracket 3 is inserted into said recess 5. In the shown embodiment, the recess 5 is provided with two such grooves 18 arranged at opposed lateral sides of the recess 5. Consequently, the shown recess 5 is configured for reception of a mounting bracket 3 provided with two flanges 19.

Each groove 18 may as in the illustrated embodiment partly be defined by a top surface 20.

A bottom surface 21 of the recess 5 may be provided with one or more protrusions 22. In the shown embodiment, the bottom surface 21 is provided with two such protrusions 22 arranged in a spaced apart manner.

In the shown embodiment, each recess 5 further comprises a projection 23 arranged at an end 24 of the recess 5.

Each mounting bracket 3 comprises two spaced apart legs 25 connected by a bridging section 26 and a tongue extending 27 from the bridging section 26 in a direction opposite to the legs 25. The mounting bracket 3 may be made in one piece.

Each mounting bracket 3 has a male connector end 6 and a female connector end 7. The male connector end 6 of each mounting bracket 3 is configured to be received by the female connector end 7 of an adjoining mounting bracket 3. In the shown embodiment, the male connector end 6 is formed by the tongue 27 and the female connector end 7 is formed by the legs 25 and the bridging section 26.

The male connector end 6 of each mounting bracket 3 is provided with a male connector engagement surface 11 and the female connector end 7 of each mounting bracket 3 is provided with a female connector engagement surface 12. In the embodiment shown in FIGS. 2*a, b*, the mounting bracket 3 is provided with two such male connector engagement surfaces 11 and two such female connector engagement surfaces 12. The male connector engagement surface 11 and the female connector engagement surface 12 may as in the shown embodiment be chamfered.

The male connector end 6 of each mounting bracket 3 is provided with at least one through hole 8 for receiving an attachment means, such as a screw. In the shown embodiment, the male connector end 6 is provided with two such through holes 8 which are countersunk.

The male connector engagement surface 11 of the male connector end 6 of each mounting bracket 3 is configured to engage the female connector engagement surface 12 of the female connector end 7 of an adjoining mounting bracket 3 associated to a neighbouring device 1 such that movement of the neighbouring device 1 is restricted when the male connector end 6 is received by the female connector end 7 of the adjoining mounting bracket 3.

The distal end 28 of the male connector end 6 of the mounting bracket 3 may be provided with a notch 29.

The mounting bracket 3 may further be provided with a central dent 30 in a surface of the mounting bracket 3 configured to face away from the device 1 when the mounting bracket 3 is inserted into its associated recess 5.

The mounting bracket 3 may further be provided with at least one abutment surface 13 configured to engage its associated device 1. In the shown embodiment, the mounting bracket 3 comprises two opposing, lateral flanges 19, each flange 19 extending along a respective leg 25 of the mounting bracket 3 and comprising one such abutment surface 13.

In the shown embodiment, each leg 25 is further provided with an opening 31. Each leg 25 is further provided with a first and second guiding groove 32*a*, 32*b* extending in the longitudinal direction of the leg 25. The first and second guiding grooves 32*a*, 32*b* are provided in a surface of the mounting bracket 3 configured to face the device 1 when the mounting bracket 3 is inserted into its associated recess 5. The first guiding groove 32*a* extends from a male connector end side of the mounting bracket 3 with an upward slope towards the opening 31. The second guiding groove 32*b* extends from a female connector end side of the mounting bracket 3 with an upward slope towards the opening 31.

As mentioned above, each mounting bracket 3 is insertable into its associated recess 5 of the device 1.

More specifically, each mounting bracket 3 is insertable into its associated recess 5 with an orientation in which the male connector end 6 extends beyond the periphery 10 of the device 1 and with an orientation in which the female connector end 7 is accessible from the periphery 10 of the device 1. Each mounting bracket 3 is thus insertable into its recess 5 with two possible orientations.

Figure 3:
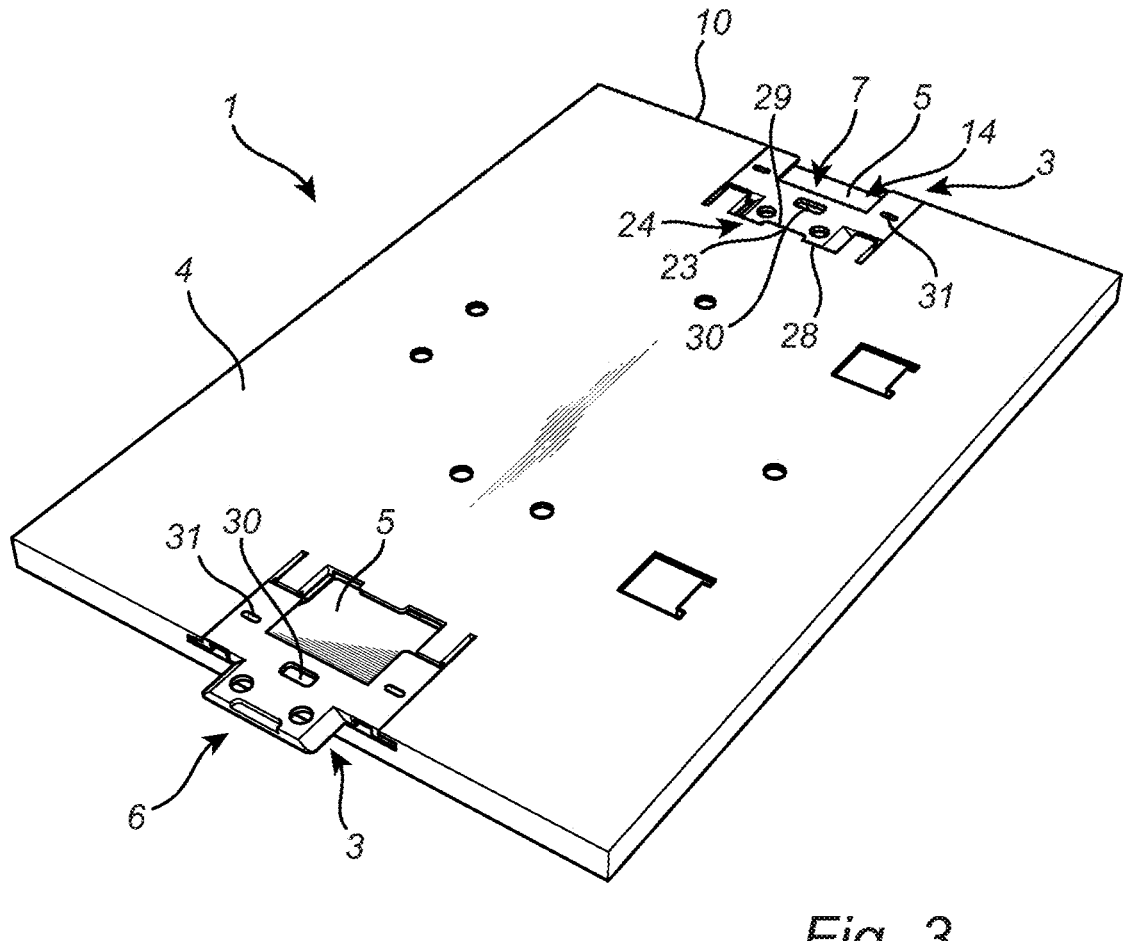
FIG. 3 is a bottom view of an arrangement in accordance with the present invention.

In FIG. 3, to which reference now is made, a device 1 of the type described above with reference to FIG. 1 is shown with a first mounting bracket 3 inserted into a first recess 5 of the device with an orientation in which the male connector end 6 extends beyond the periphery 10 of the device 1, and with a second mounting bracket 3 inserted into a second recess 5 of the device 1 with an orientation in which the female connector end 7 is accessible from the periphery 10 of the device 1. The mounting brackets 3 are of the type described above with reference to FIGS. 2a, 2b. In FIG. 3, the device is depicted in a bottom view illustrating the rear side 4 of the device 1.

In the shown embodiment, each mounting bracket 3 is slidingly insertable into its associated recess 5 from a lateral side of the device 1 via the opening 14 in the recess 5 facing the periphery 10 of the device 1.

Each mounting bracket 3 is insertable into its associated recess 5 with a snap fit. In the shown embodiment, the protrusions 22 provided on the bottom surface 21 of each recess 5 cooperate with the guiding grooves 32a, 32b and openings 31 of the mounting bracket 3 for enabling said snap fit. When the first mounting bracket 3 is inserted, the protrusions 22 of the first recess 5 will initially be received by the second guiding grooves 32b of the first mounting bracket 3 and then guided towards the openings 31 of the first mounting bracket 3 in response to insertion of the first mounting bracket 3 into the first recess 5. When the protrusions 22 reach the openings 31, they will snap into the openings 31. Correspondingly, when the second mounting bracket 3 is inserted, the protrusions 22 of the second recess 5 will initially be received by the first guiding grooves 32a of the second mounting bracket 3 and then guided towards the opening 31 of the second mounting bracket 3 in response to inserting the second mounting bracket 3 into the second recess 5. When the protrusions 22 reach the openings 31, they will snap into the openings 31.

When each mounting bracket 3 is inserted into its associated recess 5, the two opposing lateral flanges 19 of the mounting bracket 3 are received by the two grooves 18 arranged at opposed lateral sides of the recess 5. The flanges 19 are received by the grooves 18 such that the abutment surface 13 of each flange 19 faces the top surface 20 of the associated groove 18.

As mentioned above, each recess 5 comprises a projection 23 arranged at the end 24 of the recess 5 and each mounting bracket 3 has male connector end 6 with a distal end 28 provided with a notch 29. As evident from FIG. 3, the second mounting bracket 3 which is inserted into its associated recess 5 with the orientation in which the female connector end 7 is accessible from the periphery 10 of the device 1, is inserted such that the projection 23 of the recess 5 is received by the notch 29 of the second mounting bracket 3. Hereby a guide is achieved ensuring correct insertion of the second mounting bracket 3.

As mentioned above, each mounting bracket 3 may be provided with a central dent 30 in the surface of the mounting bracket 3 configured to face away from the device 1 when the mounting bracket 3 is inserted into its associated recess 5. The mounting brackets 3 illustrated in FIG. 3 are each provided with such a dent 30, which may be used for removing the mounting brackets 3 from the device 1. More specifically, each dent 30 enables removal of the mounting bracket 3 by means of a tool such as a screw driver by placing the tip of the tool inside the dent 30 for establishment of a grip enabling a manoeuvre for pushing the mounting bracket 3 out of the recess 5.

Figure 4B:
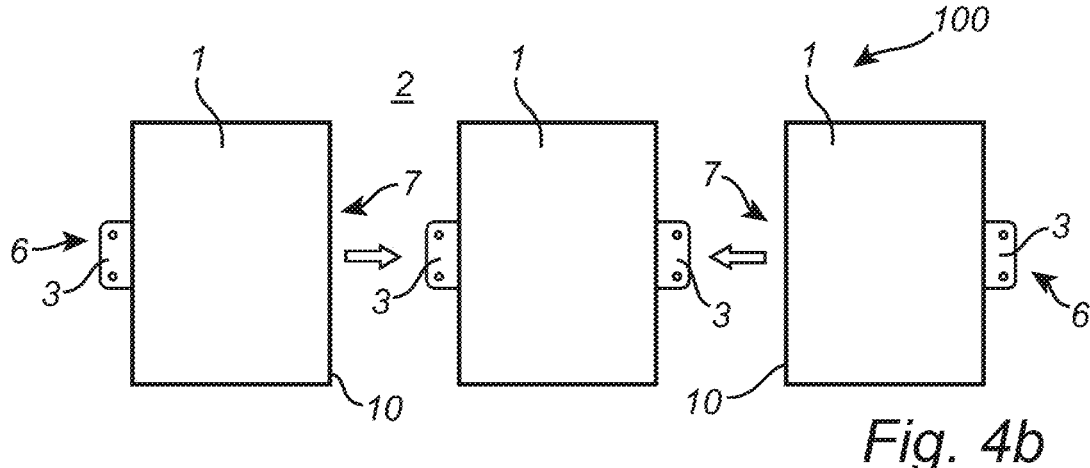
Figure 4C:
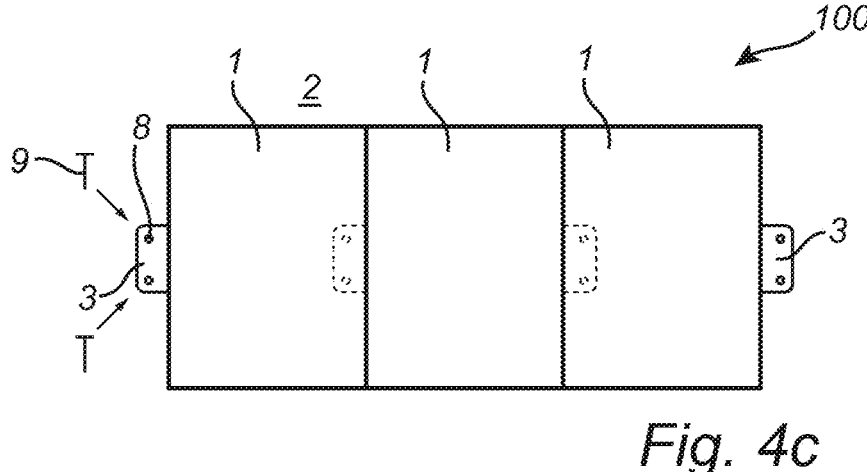

A method for attaching an arrangement 100 to a surface 2 such as a wall is illustrated in FIGS. 4a-c. The arrangement 100 comprises devices 1 of the type described above with reference to FIG. 1 and mounting brackets 3 of the type described above with reference to FIGS. 2a-b. In the figures, the arrangement 100 is depicted in a top view illustrating the first major surfaces 15 corresponding to front sides of the devices 1.

In FIG. 4a, a first device 1 of the arrangement 100 is provided.

The first device 1 is provided with recesses 5 forming a pair of oppositely arranged recesses 5 into which mounting brackets 3 have been inserted with the orientation in which the male connector end 6 of each mounting bracket 3 extends beyond the periphery 10 of the first device 1.

The first device 1 is attached to the surface 2 by means of attachment means 9 extending through the through holes 8 of the male connector end 6 of each mounting bracket 3. In the shown embodiment, attachment means 9 in the form of schematically depicted screws are used.

Each abutment surface 13 of the mounting brackets 3 is configured to engage the device 1 in response to attaching the first device 1 to the surface 2 by means of the attachment means 9 such that the first device 1 is pressed against the surface 1. In the shown embodiment, each abutment surface 13 is configured to be pressed against the top surface 20 of each groove 18 when the attachment means 9 in the forms of screws are used, thereby pressing the first device 1 against the surface 2.

In FIG. 4b, the first device 1 is shown attached to the surface 2 by the attachment means 9, and a second and a third device 1 are provided.

Each of the second and third device 1 is provided with recesses 5 forming a pair of oppositely arranged recesses 5 into which mounting brackets 3 have been inserted, one mounting bracket 3 with the orientation in which the male connector end 6 extends beyond the periphery 10 of the respective device 1 and one mounting bracket 3 (not visible) with the orientation in which the female connector end 7 is accessible from the periphery 10 of the respective device 1.

The second device 1 is arranged next to the first device 1 on the left side of the first device 1, and the third device 1 is arranged next to the first device 1 on the right side of the first device 1. Subsequently, the second and third devices 1 are moved towards the first device 1 such that the male connector ends 6 of the mounting brackets 3 of the first device 1 are inserted into the female connector ends 7 of the adjoining mounting brackets 3 of the neighbouring second and third devices 1, which is shown in FIG. 4c.

Figure 5:
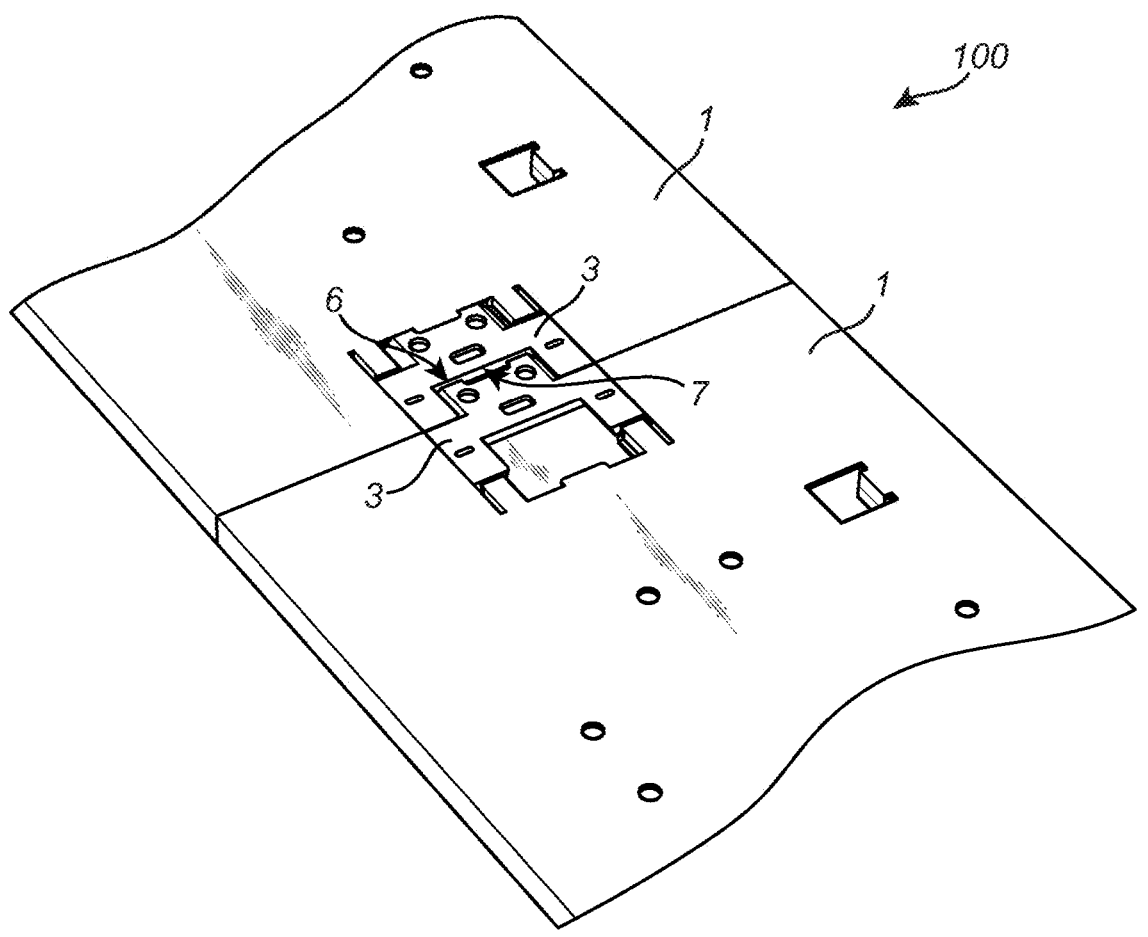
FIG. 5 is a bottom view illustrating a device provided with a mounting bracket connected to an adjoining mounting bracket of a neighbouring device.

The male connector end 6 the mounting bracket 3 being received by the female connector end 7 of an adjoining mounting bracket 3 is more clearly illustrated in FIG. 5, to which reference now also is made.

When the male connector ends 6 of the mounting brackets 3 of the first device 1 are received by the respective female connector ends 7 of the adjoining mounting brackets 3 of the neighbouring second and third devices 1, the male connector engagement surfaces 11 of the mounting brackets 3 of the first device 1 will engage the female engagement surfaces 12 of the mounting brackets 3 of the second and third device 1 such that movement of the neighbouring second and third devices 1 are restricted. In the shown embodiment, the male connector engagement surfaces 11 and the female connector engagement surfaces 12 are chamfered such that the adjoining mounting brackets 3 of the neighbouring second and third devices 1 are pressed against the surface 2. More specifically, the chamfered male connector and female connector engagement surfaces 11, 12 will cause the adjoining mounting brackets 3 to be pressed against the surface 2, which in turn will cause the abutment surfaces 13 of the adjoining mounting brackets 3 to be pushed against the top surfaces 20 of the grooves 18 of the recesses 5 of the second and third device 1, thereby causing them to be pressed against the surface 2.

Subsequently, the second and third device 1 may be secured to the surface 2 by means of the attachment means 9, for instance in the form of screws. In the figure, the second device 1 to the left has not yet been secured by means of screws whereas the third device 1 to the right has been secured to the surface 2 by means of screws.

It is understood that the inventive arrangement may be used for attaching devices next to each other in the pattern of a row and/or column. In the embodiment shown in FIGS. 4a-c, the arrangement 100 is used for attaching devices 1 next to each other in the pattern of a row.

Figure 6A:
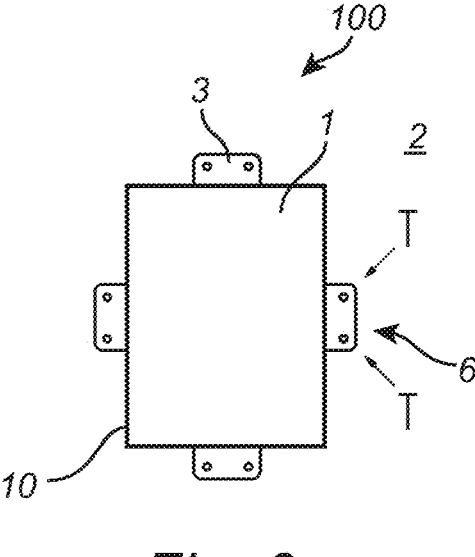
FIGS. 6a-c are schematic views illustrating steps of another embodiment in accordance with the present invention for attaching an arrangement to a surface.
Figure 6B:
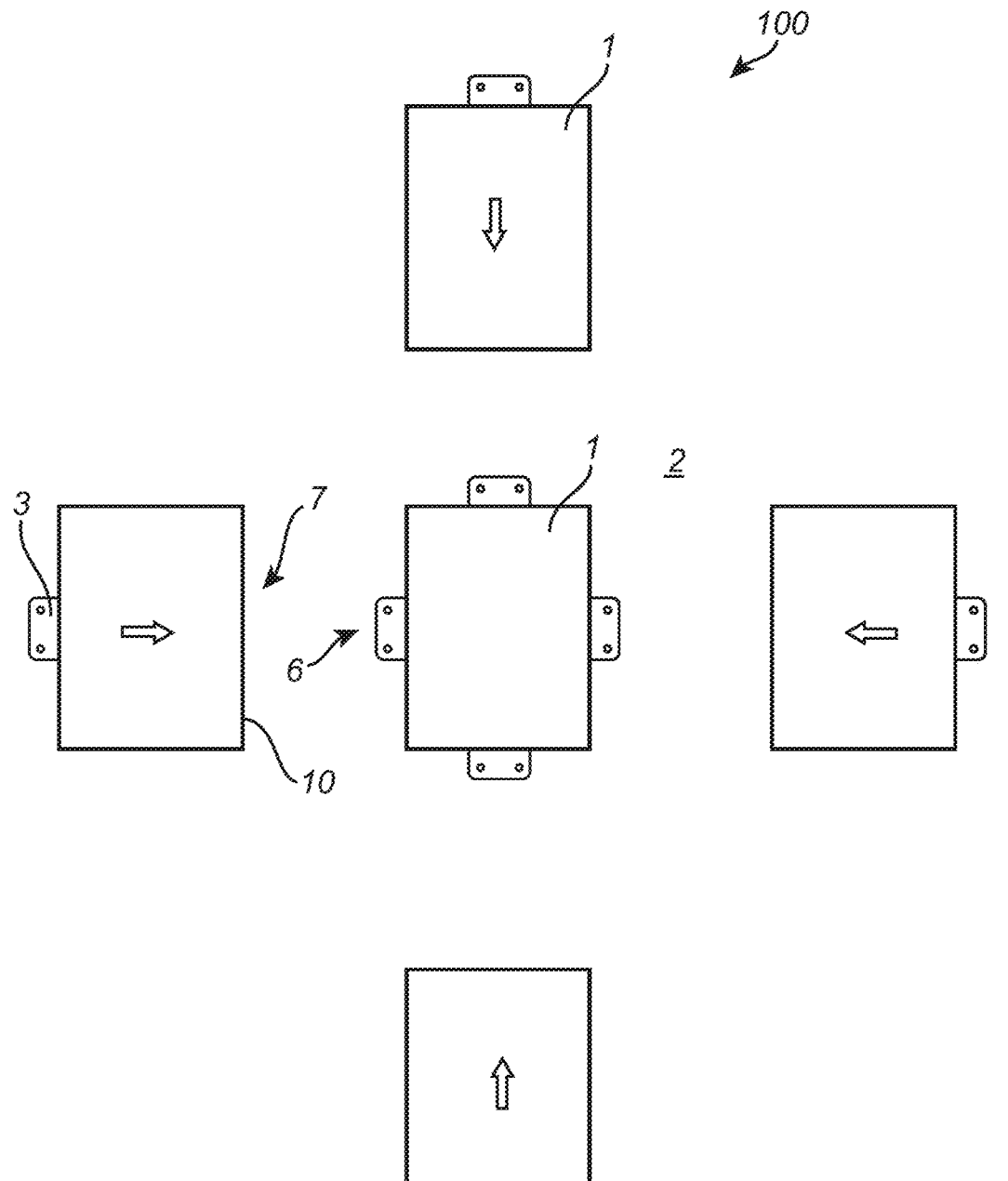
Figure 6C:
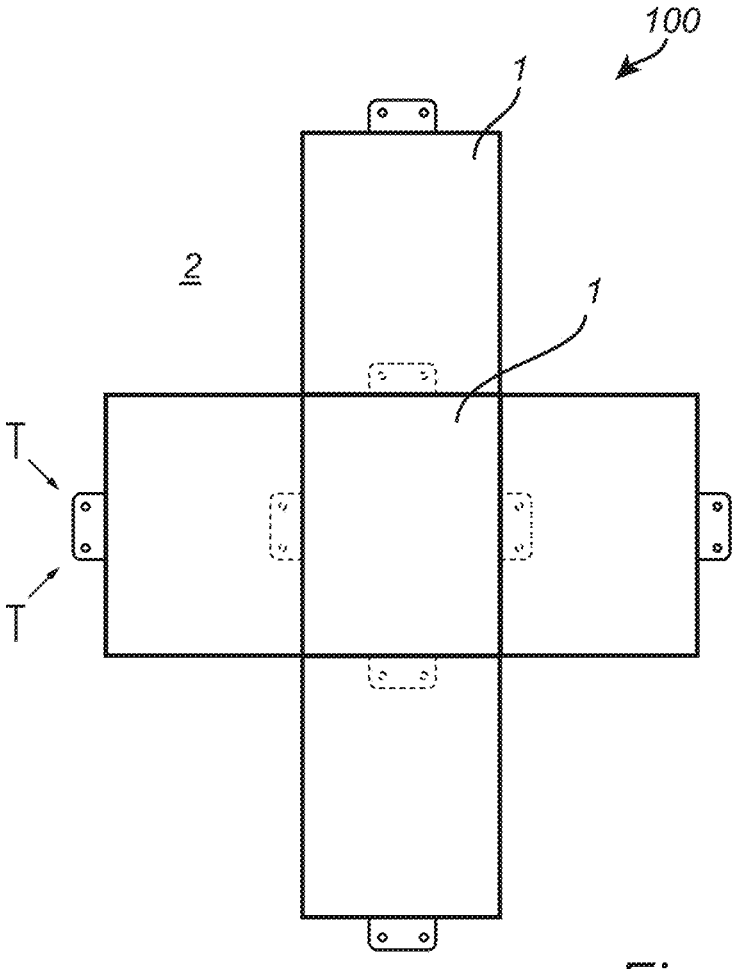

In FIGS. 6a-c, an embodiment of the invention is shown in which the devices 1 of the arrangement 100 are attached to the surface 2 next to each other in the pattern of a row and a column. In this embodiment, at least one device 1 is provided with two pairs of opposed recesses 5, i.e. four recesses 5. A mounting bracket 3 is inserted into each of these recesses 5 with the orientation in which the male connector end 6 extends beyond the periphery 10 of the first device 1 and then attached to the surface 2, as shown in FIG. 7a. A second, third, fourth and fifth device 1 are subsequently arranged next to the first 1 device on all sides, connected to the mounting brackets 3 of the first device and attached to the surface in analogy with what has been described above with reference to FIGS. 4a-c. This is shown in FIGS. 6b and 6c.

It will be appreciated that the present invention is not limited to the embodiments shown. Several modifications and variations are thus conceivable within the scope of the invention which thus is exclusively defined by the appended claims.

The invention claimed is:

1. An arrangement for attachment of a device to a surface, the arrangement comprising a device, and at least two mounting brackets, wherein the device has a rear side provided with a recess for each mounting bracket associated to the device, wherein each mounting bracket has a male connector end, wherein each male connector end is provided with at least one through hole for receiving an attachment means, wherein each mounting bracket is insertable into its associated recess with an orientation in which the male connector end extends beyond a periphery of the device, wherein each mounting bracket further has a female connector end, the male connector end being configured to be received by the female connector end of an adjoining mounting bracket associated to a neighbouring device, and wherein each mounting bracket is insertable into its associated recess with an orientation in which the female connector end is accessible from the periphery of the device.

2. The arrangement according to claim 1, in which the male connector end of each mounting bracket is provided with a male connector engagement surface and the female connector end of each mounting bracket is provided with a female connector engagement surface, wherein the male connector engagement surface of the male connector end of each mounting bracket is configured to engage the female connector engagement surface of the female connector end of the adjoining mounting bracket associated to the neighbouring device such that movement of the neighbouring device is restricted when the male connector end is received by the female connector end of the adjoining mounting bracket.

3. The arrangement according to claim 2, wherein the female connector engagement surface and the male connector engagement surface are chamfered.

4. The arrangement according to claim 1, wherein each mounting bracket is insertable into its associated recess with a snap fit.

5. The arrangement according to claim 1, wherein each mounting bracket is provided with at least one abutment surface configured to engage its associated device in response to attaching the device to the surface by the attachment means, extending through the at least one through hole of the male connector end of the mounting bracket such that the device is pressed against the surface or in response to the male end connector of the adjoining mounting bracket of the neighbouring device being received by the female connector end of the mounting bracket such that the device is pressed against the surface.

6. The arrangement according to claim 1, wherein each recess of the device has an opening facing the periphery of the device such that the mounting bracket associated to the recess is slidingly insertable into the recess from a lateral side of the device.

7. The arrangement according to claim 1, wherein the recesses of the device form at least one pair of oppositely arranged recesses.

8. The arrangement according to claim 1, wherein the device is rectangular in shape and has a first major surface; an opposing second major surface forming said rear side of the device; and four side edges forming said periphery of the device and extending between the first and second major surface.

9. The arrangement according to claim 8, wherein the recesses provided in the rear surface of the device comprise a first recess arranged in a rear surface portion adjoining a first side edge of said four side edges of the device; and a second recess arranged in a rear surface portion adjoining a second side edge of said four side edges of the device, said second side edge being opposite to the first side edge.

10. The arrangement according to claim 9, wherein the recesses provided in the rear surface of the device further comprise a third recess arranged in a rear surface portion adjoining a third side edge of said four side edges of the device; and a fourth recess arranged in a rear surface portion adjoining a fourth side edge of said four side edges of the device, said third side edge being opposite to the fourth side edge.

11. The arrangement according to claim 1, wherein the device comprises a device in the form of an electronic unit.

12. A method for attaching an arrangement to a surface, the method comprising:

providing an arrangement comprising a device, and at least two mounting brackets, wherein the device has a rear side provided with a recess for each mounting bracket associated to the device, wherein each mounting bracket has a male connector end, wherein each male connector end is provided with at least one through hole for receiving an attachment means, wherein each mounting bracket is insertable into its associated recess with an orientation in which the male connector end extends beyond a periphery of the device, wherein each mounting bracket further has a female connector end, the male connector end being configured to be received by the female connector end of an adjoining mounting bracket associated to a neighbouring device, and wherein each mounting bracket is insertable into its associated recess with an orientation in which the female connector end is accessible from the periphery of the device, inserting mounting brackets into the associated recesses of a first device of said device with the orientation in which the male connector end of each mounting bracket extends beyond the periphery of the first device, and attaching the first device to the surface by an attachment means extending through the at least one through hole of the male connector end of each mounting bracket.

13. The method according to claim 12, further comprising inserting mounting brackets into the associated recesses of a second device of said device, wherein a first of the mounting brackets is inserted into its associated recess with the orientation in which the female connector end is accessible from the periphery of the second device and wherein a second of the mounting brackets is inserted into its associated recess with the orientation in which the male connector end extends beyond the periphery of the second device, arranging the second device next to the first device such that the male connector end of one of the mounting brackets of the first device is received by the female connector end of the first of the mounting brackets of the second device, and attaching the second device to the surface by an attachment means such as a screw, extending through the at least one through hole of the male connector end of the second of the mounting brackets of the second device.

* * * * *